United States Patent
Saghizadeh

(10) Patent No.: US 9,830,414 B2
(45) Date of Patent: Nov. 28, 2017

(54) PATTERN MATCHING TECHNIQUES IN ANALOG AND MIXED SIGNAL CIRCUITS

(71) Applicant: Raytheon Company, Waltham, MA (US)

(72) Inventor: Parviz Saghizadeh, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 240 days.

(21) Appl. No.: 14/658,337

(22) Filed: Mar. 16, 2015

(65) Prior Publication Data

US 2016/0259875 A1    Sep. 8, 2016

Related U.S. Application Data

(60) Provisional application No. 62/012,779, filed on Jun. 16, 2014.

(51) Int. Cl.
    *G06F 9/45*    (2006.01)
    *G06F 17/50*   (2006.01)

(52) U.S. Cl.
    CPC ...... *G06F 17/5045* (2013.01); *G06F 17/5063* (2013.01); *G06F 17/5081* (2013.01); *G06F 2217/76* (2013.01)

(58) Field of Classification Search
    USPC .......................................... 320/103, 104, 110
    See application file for complete search history.

(56) References Cited

U.S. PATENT DOCUMENTS

| | | | |
|---|---|---|---|
| 4,651,284 | A | 3/1987 | Watanabe et al. |
| 5,867,395 | A | 2/1999 | Watkins et al. |
| 6,018,749 | A | 1/2000 | Rivette et al. |
| 6,536,018 | B1 | 3/2003 | Chisholm et al. |
| 6,895,524 | B2 | 5/2005 | Korobkov |
| 7,272,805 | B2 | 9/2007 | Mcgaughy et al. |
| 7,797,659 | B2 | 9/2010 | Chetput et al. |
| 7,937,678 | B2 | 5/2011 | Lippmann et al. |
| 8,443,329 | B2 | 5/2013 | Mcconaghy |
| 8,464,191 | B2 | 6/2013 | Mcilrath |
| 8,516,412 | B2 | 8/2013 | Cho et al. |

(Continued)

FOREIGN PATENT DOCUMENTS

| WO | WO-2015053852 A1 | 4/2015 |
|---|---|---|
| WO | WO-2015053852 A9 | 4/2015 |

OTHER PUBLICATIONS

"U.S. Appl. No. 14/454,386, Non Final Office Action dated Oct. 30, 2015", 14 pgs.

(Continued)

*Primary Examiner* — Brian Ngo
(74) *Attorney, Agent, or Firm* — Schwegman Lundberg & Woessner, P.A.

(57) ABSTRACT

A system and method for adding hierarchy to a netlist. A netlist is received and converted into a connected graph. Location parameters for the nodes of the connected graph are mapped onto the connected graph. Landmark structures are identified in the connected graph, wherein identifying includes recording a location associated with each landmark structure. Patterns are searched for in the connected graph, wherein searching proceeds outward from an anchor defined by the location of each of the identified landmark structures.

22 Claims, 10 Drawing Sheets

(56) References Cited

U.S. PATENT DOCUMENTS

| | | | |
|---|---|---|---|
| 8,701,058 | B2 | 4/2014 | Zavadsky et al. |
| 8,788,990 | B2 | 7/2014 | Meserve |
| 8,793,630 | B2 | 7/2014 | Ge et al. |
| 9,026,517 | B2 | 5/2015 | Yanagisawa |
| 9,367,659 | B2 | 6/2016 | Saghizadeh et al. |
| 2001/0034873 | A1* | 10/2001 | Arsintescu .......... G06F 17/5068 716/124 |
| 2003/0208721 | A1 | 11/2003 | Regnier |
| 2006/0101443 | A1 | 5/2006 | Nasr |
| 2006/0112356 | A1 | 5/2006 | Mcgaughy et al. |
| 2008/0184181 | A1 | 7/2008 | Chetput et al. |
| 2009/0313596 | A1* | 12/2009 | Lippmann ............. G06F 17/505 716/126 |
| 2010/0325594 | A1* | 12/2010 | Sakata ................ G06F 17/5036 716/106 |
| 2011/0246955 | A1* | 10/2011 | Ohtsuka .............. G06F 17/5077 716/112 |
| 2012/0221990 | A1 | 8/2012 | Dai et al. |
| 2012/0266121 | A1 | 10/2012 | Newcomb |
| 2013/0007676 | A1 | 1/2013 | Motiani et al. |
| 2013/0047133 | A1 | 2/2013 | Alam et al. |
| 2013/0185683 | A1 | 7/2013 | Lee et al. |
| 2013/0275929 | A1 | 10/2013 | Suzuki |
| 2015/0100928 | A1* | 4/2015 | Saghizadeh ......... G06F 17/5045 716/102 |

OTHER PUBLICATIONS

"U.S. Appl. No. 14/454,386, Response filed Feb. 1, 2016 to Non-Final Office Action dated Oct. 30, 2015", 9 pgs.

"International Application Serial No. PCT/US2014/050180, International Search Report dated Oct. 16, 2014", 4 pgs.

"International Application Serial No. PCT/US2014/050180, Written Opinion dated Oct. 16, 2014", 8 pgs.

Bouchaour, Hamza, et al., "Towards a method for VLSI circuit reverse engineering", Proceedings of the Third International Conference on Computer Science and its Applications (CIIA'11) [online]. [retrieved on Oct. 7, 2014]. Retrieved from the Internet: <URL: http://ceur-ws.org/Vol-825/paper_4.pdf>, (Dec. 13, 2011), 5 pgs.

Singh, K J, et al., "Extracting RTL Models from Transistor Netlists", 1995 IEEE/ACM International Conference on Computer-Aided Design (ICCAD-95)., (1995), 11-17.

White, J. L., et al., "Efficient Algorithms for Subcircuit Enumeration and Classification for the Module Identification Problem", Proceedings, 2001 International Conference on Computer Design (ICCD)., (2001), 519-522.

"U.S. Appl. No. 14/454,386, Corrected Notice of Allowance dated Mar. 16, 2016", 5 pgs.

"U.S. Appl. No. 14/454,386, Notice of Allowance dated Feb. 24, 2016", 8 pgs.

"International Application Serial No. PCT/US2014/050180, International Preliminary Report on Patentability dated Apr. 21, 2016", 9 pgs.

* cited by examiner

PATTERN MATCHING TECHNIQUES IN ANALOG AND MIXED SIGNAL CIRCUITS

PRIORITY CLAIM

This application claims priority under 35 U.S.C. 119(e) to U.S. Provisional Patent Application Ser. No. 62/012,779, filed Jun. 16, 2014 which is incorporated herein by reference in its entirety.

GOVERNMENT RIGHTS

This invention was made with Government support under government contract HR0011-11-C-0058 awarded by the Department of Defense. The Government has certain rights in this invention.

BACKGROUND

As products age, it becomes increasingly difficult to obtain parts needed to repair the products. Sometimes, it is necessary to reverse engineer an integrated circuit (IC), but such a task is difficult.

Destructive and non-destructive techniques such as SEM imaging, IR and X-ray techniques can be used to image an integrated circuit (IC) and produce a low level netlist that represents the circuitry in the IC. However, this extracted netlist is a raw netlist at the element level, i.e., resistor, capacitor, inductor and transistor levels. For large and complex ICs it is extremely hard if not impossible to understand this low level netlist in its raw form or even in the gate or cell level form. In order to understand the functionality of the IC or whether the IC is compromised, the netlist needs to be converted to a higher level form.

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As noted above, in order to understand the functionality of the IC or whether the IC is compromised, the netlist is converted to a higher level abstraction. Sometimes, to understand the functionality of the IC or whether the IC is compromised, the netlist is converted to a higher level netlist. Other times, in order to understand the functionality of the IC or to be able to compare it to a spec data sheet, the netlist is converted to a behavioral model.

Figure 1:
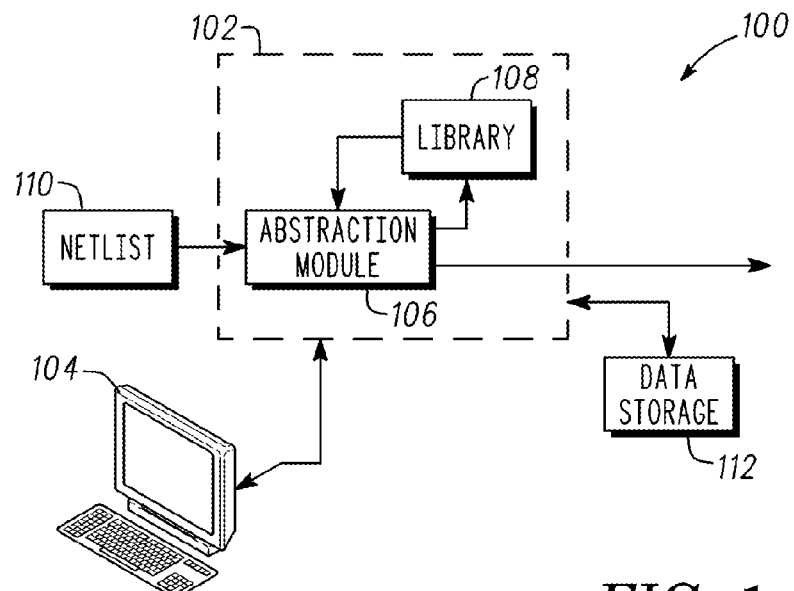
FIG. 1 illustrates a pattern matching system for converting a netlist into a higher level abstraction.

A system 100 for converting a netlist into a higher level abstraction is shown in FIG. 1. System 100 includes a computing device 102 connected to a display 104. In the example embodiment of FIG. 1, computing device 102 includes abstraction module 106 and library 108. In one such embodiment, abstraction module 106 receives a netlist 110 extracted from an integrated circuit and searches netlist 110 for patterns that already exist in library 108. In one embodiment, abstraction module 106 includes pattern matching software which implements one or more pattern matching search algorithms. As analog and mixed-signals ICs get larger and more complex, intelligent and fast search algorithms are required for these pattern matching algorithms.

To address this, in one embodiment, the pattern matching search algorithm of abstraction module 106 in FIG. 1 is treated like an optimization program. It incorporates search optimization techniques and applies landscaping to optimize the search algorithm.

In some embodiments, computing device 102 is connected to a data storage device 112. In some such embodiments, data storage device 112 is used to store program instructions and data used by a processor in computing device 102, including the patter matching search algorithm of FIG. 2 and the behavioral pattern matching of FIG. 6.

Figure 2:
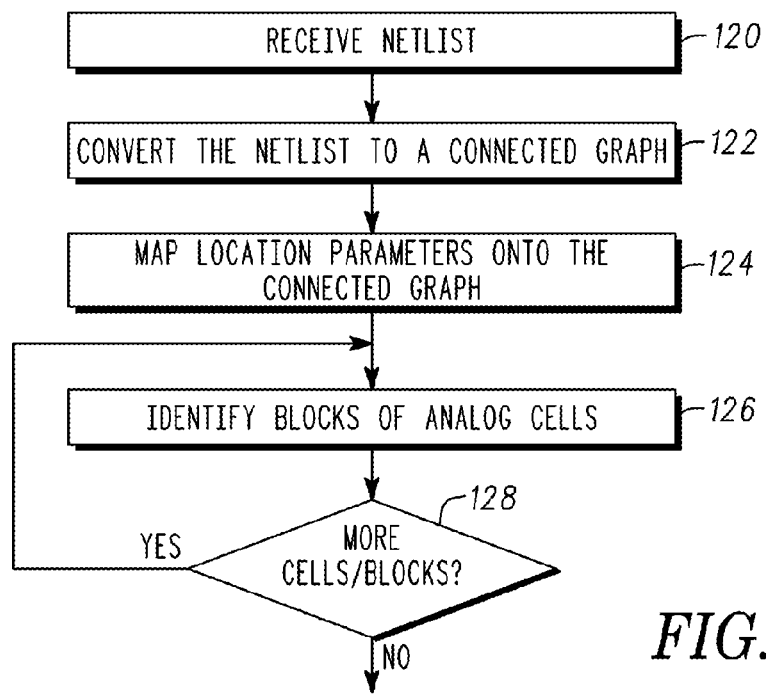
FIG. 2 illustrates a method of converting the netlist of an integrated circuit into a higher level abstraction.

A method of generating a higher level netlist from a netlist extracted from an integrated circuit having analog or mixed-signal circuits is shown in FIG. 2. In the example embodiment shown in FIG. 2, a netlist is received at 120 and converted at 122 to a connected graph. In one example embodiment, the netlist is extracted from a device under review. Location parameters from the device under review are mapped over the connected graph at 124 and blocks of analog cells are identified within the connected graph at 126. More complex blocks of analog cells are built iteratively from simpler blocks of analog cells at 126 and 128 in order to build a circuit model.

Figure 3:
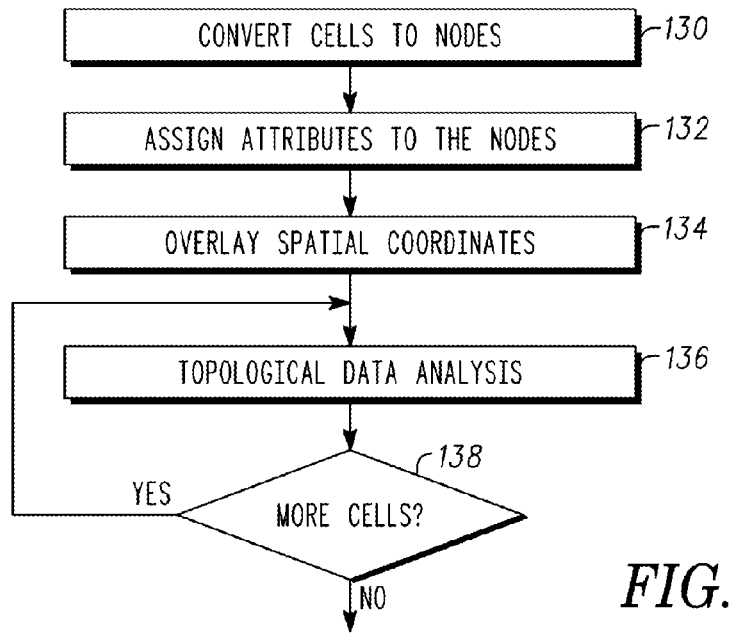
FIG. 3 illustrates an example embodiment of standard pattern matching search and hierarchy extraction.

In one example embodiment, as is shown in FIG. 3, the low element level netlist is converted at 130 to a graph with each element or net (wire) being represented by a node (vertex). Each node is assigned attributes at 132 that describe and constrain the element it represents. The spatial XYZ coordinates of each element are overlayed with the netlist and are attached to each node as a spatial coordinate attribute at 134. The I/O terminals of each node are represented by edges (connections) between nodes. Topological data analysis on the resulting graphical representation is used at 136 to locate and identify simple to complex shapes and patterns in order to extract hierarchy and functionality from the netlist. A check is made at 138 to determine if more cells are available to analyze. The recursive data analysis continues to search for patterns and shapes and to perform pattern matching to analog blocks in reference libraries 108. When a pattern is matched both the netlist and library 108 are updated simultaneously to incorporate the new hierarchy that represents the matched block. Both top-down and bottom-up approaches are used to extract hierarchy and functionality. In the top-down analysis large jumps in XY coordinates of otherwise adjacent elements can represent dead spaces in the layout domain which is utilized to carve out boundaries for large functional blocks.

The process extracts hierarchy and functionality from a netlist and helps create a high level model of a mixed-signal integrated circuit. The result is the conversion of a low (R, C, L, transistor) level netlist to a high-level human-readable netlist. The high-level netlist allows for the comparison of the resident circuit on a mixed signal integrated circuit to its datasheet, and for the discovery and detection of malicious or suspect circuitry in an IC.

In one embodiment, pattern matching algorithms are used to extract hierarchy and functionality from a low level netlist. The pattern matching algorithm searches the netlist for patterns that already exist in library 108. When a pattern is matched the netlist is updated to incorporate the new hierarchy that represents the matched block.

Due to the increasing size and complexity of mixed signal ICs, a search algorithm could be very slow or could produce many false positives (unintended pattern matches) unless it is guided like an optimization algorithm. In one embodiment, computing device 102 uses a search procedure that maximizes convergence speed and minimizes false (local) minima. In one embodiment, computing device 102 selects from three main areas of optimization: optimal initial point/ landmark for the search algorithm, optimal initial hops, and optimal search space.

Selecting the initial point for each pattern search can affect the correctness and the speed by which the search process converges. By selecting unique mini structures or less abundant landmarks than are usually found in most analog and mixed signal circuits as the initial point of the search process, the algorithm can converge faster and avoid false positive matches. These mini structures and landmarks have more specific topology and are staples in analog and mixed signals ICs.

Figure 4:
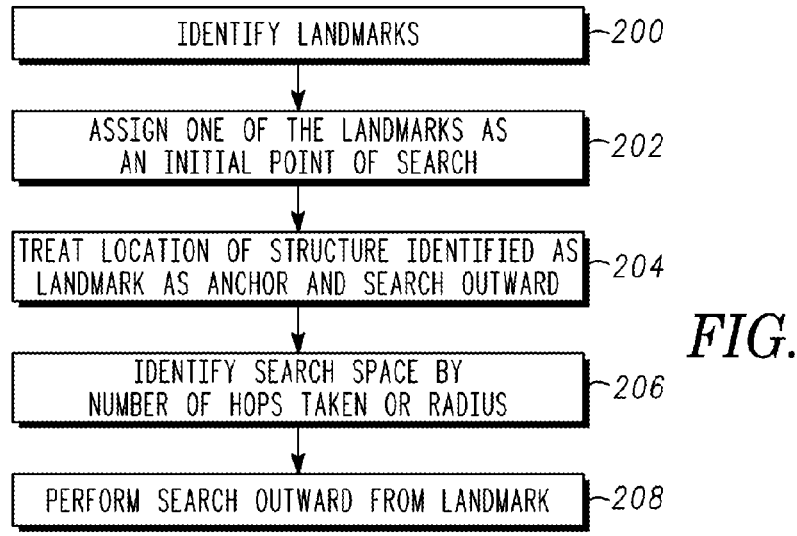
FIG. 4 illustrates an example embodiment of landmark-based search analysis.

An example embodiment is shown in FIG. 4. In the embodiment shown in FIG. 4, landmarks are identified at 200. In one such embodiment, a survey of analog and mixed signal circuits leads to a short list of structures and landmarks that are optimal starting point for each pattern match search. In one embodiment, each library block is given an attribute that communicates with the algorithm whether the block contains any of the said structures and landmarks. Since these mini structures and landmarks are specific and thereby less abundant, assigning them as initial points for the search at 202 limits the search space, helps with convergence and minimizes false positives. In the case a block has more than one such structures or landmarks, a search priority is used based on the rarity of the structures/landmarks in analog or mixed signal circuits. Once structures have been identified, treat them as anchors and search outward at 204.

In operation 206, the search space is identified by the number of hops taken or a radius. In operation 208, a search is performed outward from the landmark.

As noted above, the initial point for each pattern search can affect the correctness and the speed by which the search process converge. In one embodiment, therefore, an optimal initial point/landmark is determined for the search algorithm by selecting unique mini structures or less abundant landmarks that are usually found in most analog and mixed signal circuits as the initial point of the search process. By doing this, the algorithm can converge faster and avoid false positive matches.

In one embodiment, unique mini structures or less abundant landmarks usually found in most analog and mixed signal circuits are selected as the initial point of the search process. These mini structures and landmarks have more specific topology and are staples in analog and mixed signals ICs. By using these structures and landmarks, the algorithm converges faster and avoids false positive matches.

In one example embodiment, a survey of analog and mixed signal circuits leads to a short list of structures and landmarks that are optimal starting points for each pattern match search. In one such embodiment, the order of search priority is based on the rarity of the structures in analog circuits In one embodiment, each library block is given an attribute that communicates whether the block contains any of the identified structures and landmarks. Since these mini structures and landmarks are specific and thereby less abundant, assigning them as initial points for the search will limit the search space, helps with convergence and minimizes false positives. If a block has more than one such structures or landmarks, search priority is based on the rarity of the structures or landmarks in analog or mixed signal circuits.

In summary, abstraction module 106 receives a netlist, converts the netlist into a connected graph, maps location parameters onto the connected graph and identifies one or more landmark structures in the connected graph. In some embodiments, identifying one or more landmark structures, wherein identifying includes recording a location associated with each of the one or more landmark structures. A search is made for patterns in the connected graph. The search proceeds outward from an anchor defined by the location of each of the one or more identified landmark structures. In one embodiment, mapping location parameters includes attaching a spatial coordinate attribute to each node.

In one embodiment, searching for patterns includes identifying patterns that exist in a library and modifying the connected graph to replace a matched pattern with its more abstract match. In one embodiment, identifying landmark structures includes identifying, as an initial landmark, a landmark that includes rarer abundant structures. In another embodiment, identifying landmark structures includes identifying, as initial landmarks, landmarks that have been shown to drive the search to converge more quickly. In yet another embodiment, identifying landmark structures includes identifying a priority by which the connected graph is searched for landmarks.

In one embodiment, if a first structure and a second structure are treated as equal priority, searching for patterns in the connected graph includes selecting the structure that is closest to a particular landmark structure. In one such embodiment, selecting the structure that is closest to a particular landmark structure includes modifying the connected graph to replace the selected structure with a more abstract match. In one embodiment, searching for patterns in the connected graph includes searching for patterns that include the more abstract matches and replaced the patterns that include the more abstract matches with a higher level structure.

As noted above, in some embodiments, system 100 includes an abstraction module 106 and a library 108. Abstraction module 106 receives the netlist, converts the netlist into a connected graph, assigns a location parameter to nodes within the connected graph and searches the connected graph for patterns that exist in the library. The search proceeds in a predefined order through the patterns in the library. In some embodiments, the predefined order defines a search that searches for less common patterns before searching for more common patterns.

In some embodiments, abstraction module 106 implements one or more pattern matching search algorithms, including searching for one or more landmark structures as search anchors and searching outward from the anchors. In some such embodiments, abstraction module 106 searches outward from the anchors, wherein searching outward from the anchors includes finding all elements connected to the anchor and determining if the elements connected to the anchor match one or more patterns in the library. In other such embodiments, abstraction module 106 searches outward from the anchors, wherein searching outward from the anchors includes finding all elements within a pre-defined distance of the anchor and determining if the elements found within the pre-defined distance of that anchor match one or more patterns in the library.

Figure 5A:
FIGS. 5A through 5X illustrate an example set of initial landmarks in accordance with some embodiments.
Figure 5B:
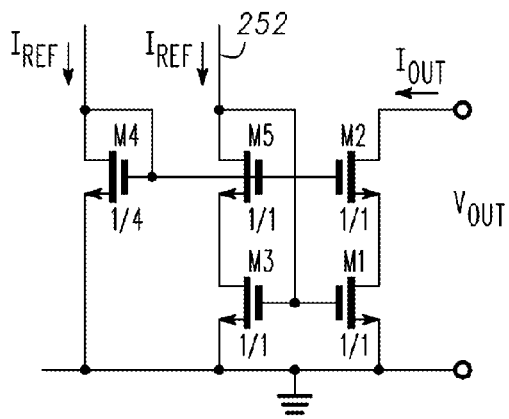
Figure 5C:
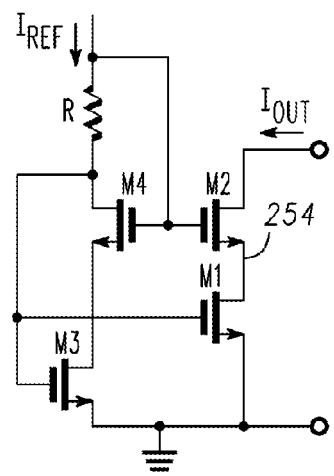
Figure 5D:
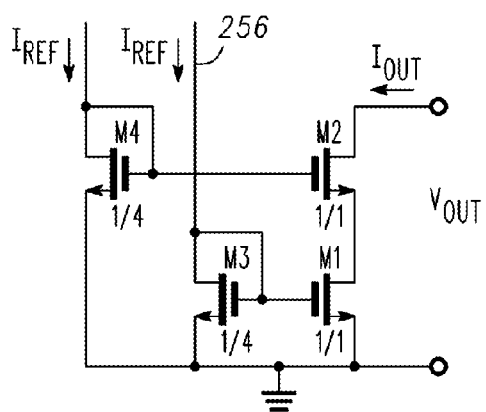
Figure 5E:
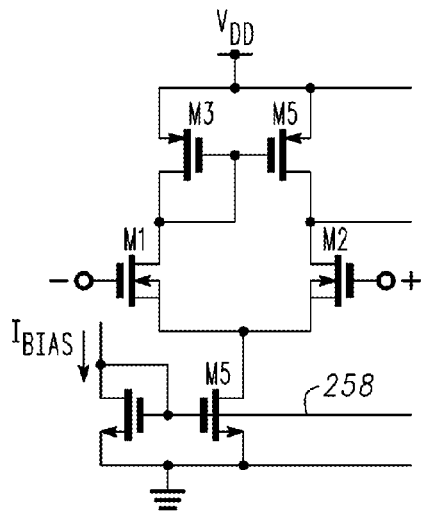
Figure 5F:
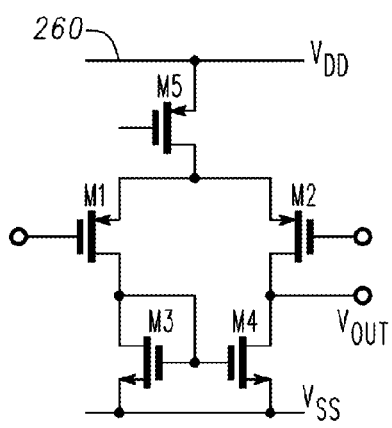
Figure 5G:
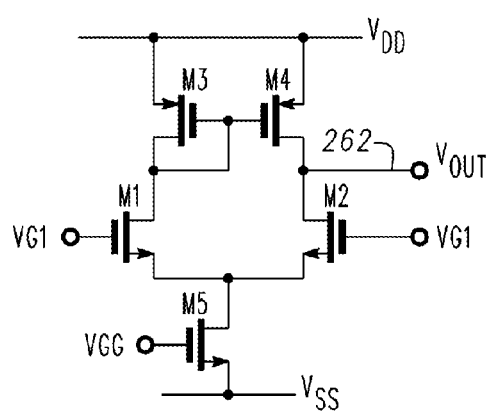
Figure 5H:
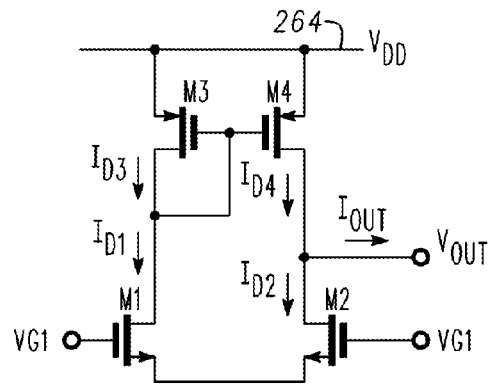
Figure 5I:
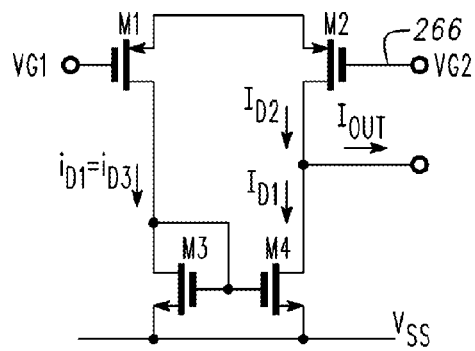
Figure 5J:
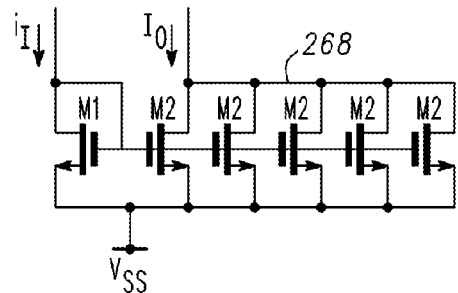
Figure 5K:
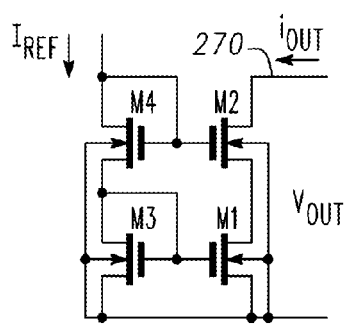
Figure 5L:
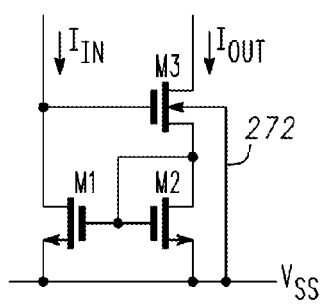
Figure 5M:
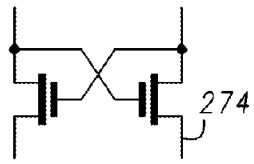
Figure 5N:
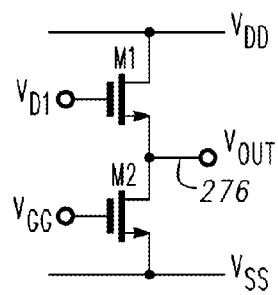
Figure 5O:
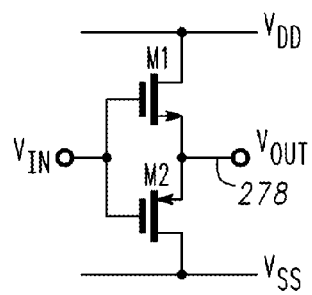
Figure 5P:
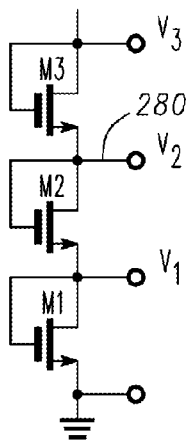
Figure 5Q:
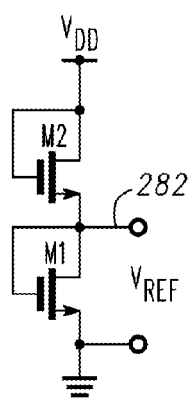
Figure 5R:
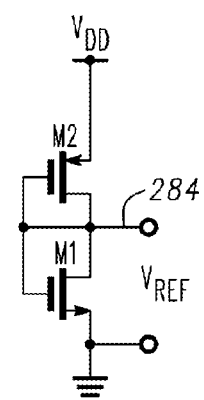
Figure 5S:
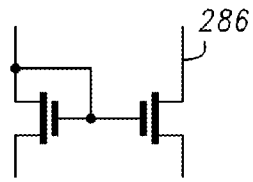
Figure 5T:
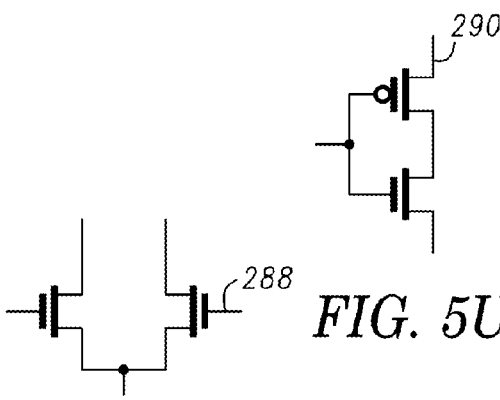
Figure 5U:
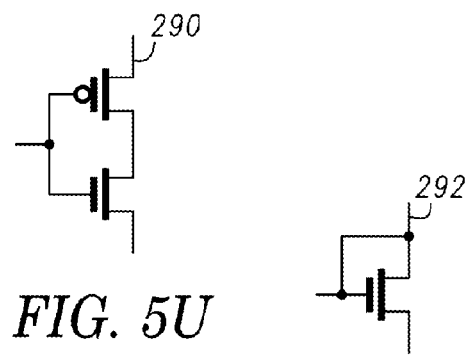
Figure 5V:
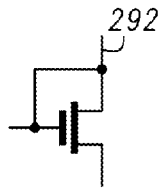
Figure 5W:
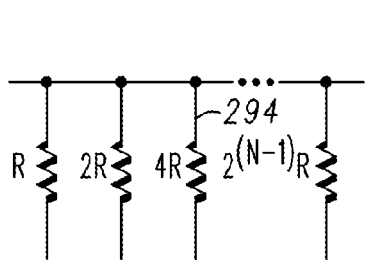
Figure 5X:
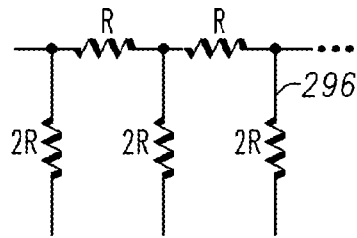

An example set of initial landmarks is shown in FIGS. 5A through 5X. In the example embodiment of FIGS. 5A through 5X, the structures listed are in the order of search priority based on the rarity of the structures in analog circuits. In one example embodiment, for each analog library block (cell), if the structures are present in the library block, start search with the following structures in the order listed. In other embodiments, other attributes beside the order listed are used to set the priority in which structures are searched. For instance, in some embodiments, two or more structures are treated as equal priority and a factor such as proximity to other particular structures is used to select the order in which the two or more structures are searched. As noted above, once structures have been identified, treat them as anchors as in 204 above and search outward in a radial fashion.

In the example embodiment of FIGS. 5A through 5X, device 102 first looks for all inductors 250 in the netlist. Once this is done, device 102 looks for improved high swing cascade current sinks (sources) 252 (as shown in FIG. 5B). Then device 102 looks for self-biased high swing cascade current sinks (sources) 254 (as shown in FIG. 5C). Then device 102 looks for high swing cascade current sinks (sources) 256 (as shown in FIG. 5D). Then device 102 looks for N-channel input pair differential amplifiers with current mirror current sinks 258 (as shown in FIG. 5E). Then device 102 looks for P-channel input pair differential amplifiers with single transistor current sources 260 (as shown in FIG. 5F). Then device 102 looks for N-channel input pair differential amplifiers with single transistor current sinks 262 (as shown in FIG. 5G).

Next, device 102 looks for N-channel input pair differential amplifiers 264 (as shown in FIG. 5H). Then device 102 looks for P-channel input pair differential amplifiers 266 (as shown in FIG. 5I). Then device 102 looks for multi-branch current mirrors 268 (as shown in FIG. 5J). The number of branches could vary. FIG. 5J, for example, shows a current mirror with five branches. Next, device 102 looks for current sinks and current sources 270 (as shown in FIG. 5K). Then device 102 searches for Wilson current sinks 272 (as shown in FIG. 5L), and the P-channel dual of sink 272.

Next, device 102 looks for cross-coupled transistors 274 (as shown in FIG. 5M). Then device 102 looks for source follower output stage amplifiers 276 (as shown in FIG. 5N). Then device 102 looks for source follower push-pull output stage amplifiers 278 (as shown in FIG. 5O). Then device 102 looks for active voltage divider reference circuits 280 (as shown in FIG. 5P). Then device 102 looks for active voltage divider reference circuits 282 (as shown in FIG. 5Q). Then device 102 looks for active voltage divider reference circuits 284 (as shown in FIG. 5R). Then device 102 looks for current mirrors 286 (as shown in FIG. 5S).

Next, device 102 looks for source followers 288 (as shown in FIG. 5T). If part of a differential pair, then the two transistors are matched (i.e., equal W's and L's among others, including close proximity and symmetric layout).

Next, device 102 looks for push-pull inverters 290 (as shown in FIG. 5U). Then device 102 looks for diode connected transistors 292 (as shown in FIG. 5V). Then device 102 looks for binary-weighted resistance networks 294 (as shown in FIG. 5W). Then device 102 looks binary-weighted R-2R ladder networks 296 (as shown in FIG. 5X).

After the appropriate landmarks have been identified in the order described above, they are treated as anchors and computing device 102 searches outward from the anchors as described below.

The examples shown in FIGS. 5A through 5X are not exhaustive. In some example embodiments, library 108 stores landmarks that have been identified; new landmarks are added as they are identified.

In some cases the P or N channel dual circuit is listed but in most cases they are not. The source or sink circuitry applies to the N-channel or P-channel dual circuit.

The list also applies to bipolar and bi-cmos circuitry as well since the topology can be the same.

In some embodiments, super landmarks (a combination of two or more landmarks) are identified during search and added into the library 108 as part of the method shown in FIG. 2.

In some embodiments, a search process identifies all landmarks in library 108. In other embodiments, the search process identifies only a select set of the landmarks in library 108.

In some embodiments, all patterns apply equally to both NMOS and PMOS structures, as well as PNP and NPN structures. In the latter two cases the Base=Gate, Emitter=Source and Collector=Drain.

In one embodiment, a library 108 is formed from structures that are staples in analog design.

As noted above, another means to optimize the search process and minimize false positives is to treat the initial point as the anchor for the search process, meaning, in some embodiments, the search algorithm initially travels only one hop away from the initial point to find all elements connected to the anchor. Only when that is done does the search algorithm ventures outward to find other elements to match to the pattern in the library. This technique allows for a more specific or unique pattern to radiate out form the anchor as opposed to a branch should the search engine take multiple contiguous hops in one direction away from the anchor.

In one embodiment, therefore, abstraction module 106 searches outward from the anchors includes identifying all elements connected to the anchor and searching for patterns in those elements before proceeding outward further from the anchor.

Another mechanism for optimizing the search process is to limit the search space. In a well-designed and practical design the elements that make up a functional block are laid next to each other or at the least within close proximity. Using the XY coordinates of the elements the search, at least for the initial pass, can be limited to a predetermined distance from the initial point of search. In one embodiment, the initial point for the search is designated as the center of a radial window with programmable radius. The radius depends on the technology and the node size (feature size). Searching within a radius of the initial point as opposed to searching the entire netlist speeds up the search process many fold. It also minimizes false positives by not allowing the search algorithm to venture too far out in every direction looking for a potential pattern match.

In one embodiment, therefore, abstraction module 106 searches outward from the anchors includes identifying all elements that fall within a pre-defined distance from each anchor and searching for patterns in those elements before proceeding outward further from the anchor.

In one embodiment, first you identify all landmarks in the library. Then you identify all landmarks that include two or more landmarks (i.e., "super landmarks"). Then you apply the landmarks to the netlist and identify all landmarks in the netlist.

The system and method described above treats the pattern matching search process as an optimization problem. Mini structures and landmarks that have more specific topology and are less abundant, yet are staples in analog and mixed signals designs, are identified and the search process is optimized by assigning one of the mini structures or landmarks in library 108 as the initial point (anchor) of each search process, given that the said structures or landmarks exist in library 108.

The initial point is then treated as the anchor and a search conducted in a radial fashion away from the anchor. Limiting the initial search space to a radial window centered around the initial point with technology dependent programmable radius speeds up the search process and minimizes false positives by not allowing the search algorithm to venture too far out in every direction looking for a potential pattern match.

The approach described above can be used to reverse engineer a mixed signal IC. It can be used to perform a hierarchy extraction from a netlist, a functionality extraction from a netlist, a behavioral model generation for a netlist. It can also be used as part of detecting and preventing a cyber attack, for malicious circuit detection, as part of supply chain risk management, for parts screening and to prevent obsolescence.

As noted above, sometimes, in order to understand the functionality of the IC or be able to compare it to a spec data sheet, the netlist needs to be converted to a behavioral model. Previously, there were no automated techniques to extract hierarchy and functionality from a gate/cell level netlist into a behavioral model. A method is described next that reverse engineers a netlist into a human-readable form. Such a method allows for the comparison of the resident circuit on a mixed signal integrated circuit to its commercially available datasheet and helps with the detection of malicious or suspect circuitry in an integrated circuit.

What is described is behavioral pattern matching in netlist modeling of mixed signal circuits. Behavioral pattern matching operates on a hierarchical netlist as opposed to a flat netlist. It is assumed that the netlist has some level of hierarchy at the cell or sub-block levels. In one embodiment, computing device 102 employs this method to convert a hierarchical netlist to an equivalent block level model at the behavioral level. Device 102 also can use this method to extract high level hierarchy and functionality from a hierarchical netlist. Finally, device 103 can use this method to create a high level model of the mixed-signal integrated circuit. The method is automated, fast, scalable and cost-effective. It operates in the graph domain and can incorporate the search optimization techniques described above.

Figure 6:
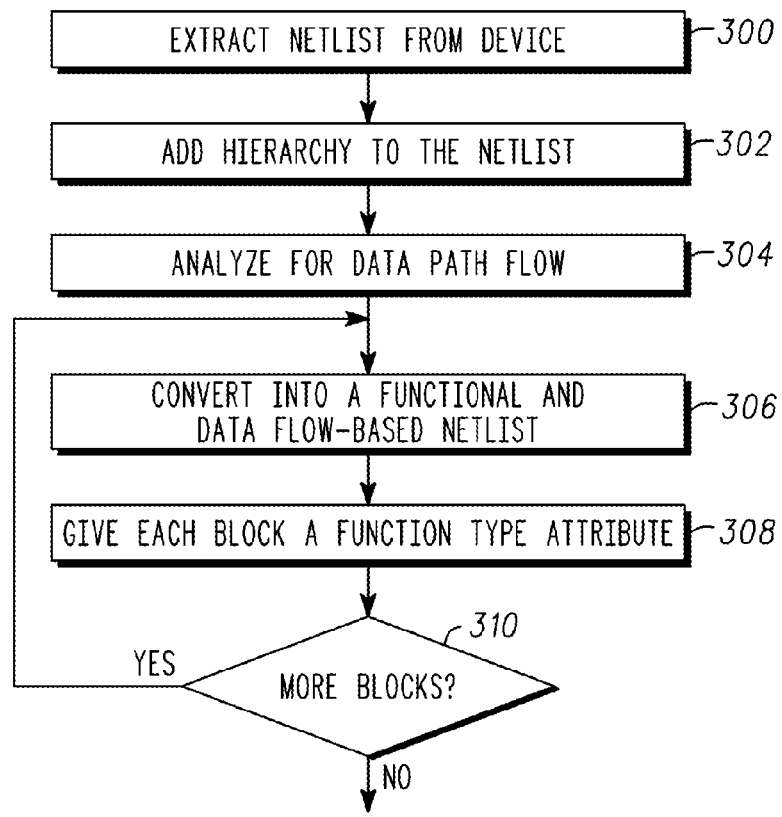
FIG. 6 is an example of a behavioral pattern matching method in accordance with some embodiments.

In one example behavioral pattern matching embodiment, as shown in FIG. 6, a netlist is extracted at 300 and hierarchy is added at 302. In some such embodiments, a cell/block level netlist is converted to a graphical representation with each block being represented by a node (vertex). One approach for adding hierarchy to a netlist is described above in connection with FIGS. 3-5.

In some example embodiments, each node has attributes that describe and constrain the block it represents. The graphical netlist is then analyzed at 304 for data path flow, where the major arteries are identified, and nets are grouped and bussed together based on source and destination types and physical location on the chip. The netlist is converted into a minimal functional and data flow based netlist at 306.

In some embodiments, each block is given a "function type" attribute at 308. In some such embodiments, the "Type" attribute identifies the function the block performs. In some embodiments, the function type attribute can range from coarse to fine, meaning a block can be identified as having a generic function or a more specific function. An example of a coarse "function type" attribute is "Frequency Divider". An example of a fine "function type" attribute is "Asynchronous Divide by 8 Frequency Divider".

The process repeats at 310 as necessary.

In one embodiment, a library 108 of all know analog and mixed signal functions is created where all functions are represented at the block diagram level with each block having a function type attribute. The blocks are connected with I/O vectors in a data flow (flow diagram) fashion. What identifies each function in the library are the type of blocks the function is made of and the data vector flow between blocks. There could be many flavors (variations) of the same block that can be allowed for a particular function. In some embodiments, blocks in a library function include a "bypass" attribute. Attribute "bypass"=1 means that the block does not have to be in the flow and can be bypassed. This allows for more variations of a function in the library.

In some embodiments, the behavioral library includes functions that are identified by a set of block types connected in a certain flow diagram. All blocks are black boxes with "function type" attributes. The behavioral library can be implemented in Verilog where each function is a module made of a set of blocks which are in turn modules. Except in special cases, the function modules have a minimum of 2 and a maximum of 3 ports. These ports are an input, an output and possibly an in/out. Some embodiments, however, permit multiple input and output vectors. For instance, in the case of a differential amplifier, two input vectors may be assigned.

The behavioral topology matching is a recursive process. Each newly generated block will be placed in the library and in turn be treated as a black box.

In some embodiments, a pattern matching algorithm searches the post processed graphical netlist under test for block type and data flow. When a number of block types are matched to the library and the data flow amongst them are also matched to that in the library then a functional match is achieved. The collection of blocks is replaced by their equivalent functional model.

In one embodiment, all cells/blocks are black-boxed. The power and GND supplies are torn out unless they are part of data path flow (such as in the case of DC-DC converters or voltage regulators). The clock distribution network is torn out minus parts that directly impact data flow. (Clock generation circuitry is retained because it is a functional entity.) The I/O terminals of the blocks are then collapsed into a minimal number of I/O vectors representing data path flow only.

Finally, all nets (wiring) between blocks are collapsed and replaced by data flow paths only.

As noted above, in some embodiments, in the post processed netlist each block is given a "function type" attribute. The "Type" attribute will identify what functionality the block performs. The function type attribute can be coarse or fine, meaning a block can be identified as having a generic function or a more specific function. An example of a coarse "function type" attribute is "Frequency Divider". An example of a fine "function type" attribute is "Asynchronous Divide by 8 Frequency divider".

In some embodiments, a library of all known analog and mixed signal functions is created where all functions are represented at the block diagram level with each block having a function type attribute. The blocks are connected with I/O vectors in a data flow (flow diagram) fashion. What identifies each function in the library are the type of blocks the function is made of and the data vector flow between blocks. As noted above, there can be many flavors (variations) of the same block for a particular function.

In some embodiments, the behavioral library includes functions that are identified by a set of block types connected in a certain flow diagram. As noted above, all blocks are black boxes with "function type" attributes. In some embodiments, the behavioral library is implemented in Verilog, where each function is a module made of a set of blocks which are in turn modules. Except in special cases the function modules will have a minimum of two and a maximum of three ports. These ports are an input, an output and possibly an inout. In special cases it may be warranted to have multiple input and output vectors. For instance, in the case of a differential amplifier two input vectors may be assigned.

In some embodiments, behavioral topology matching is a recursive process. Each newly generated block is placed in library 108 and, in turn, is treated as a black box.

In some embodiments, the pattern matching algorithm searches the post processed graphical netlist under test for block type and data flow. When a number of block types are matched to the library and the data flow amongst them are also matched to that in the library then a functional match is achieved. The collection of blocks is then replaced by their equivalent functional model.

In one embodiment, a dynamic library is used. The library is updated via simultaneous hierarchy development in the netlist and the library.

In one embodiment, abstraction module 106 includes a processor that receives the netlist, adds hierarchy to the netlist to form a hierarchical netlist, analyzes the hierarchical netlist for data flow and converts the hierarchical netlist into a functional and data flow-based netlist of blocks. In one such embodiment, library 108 includes a plurality of functional blocks, wherein each block includes an input vector definition, an output vector definition and attributes and constraints assigned to the block.

In one embodiment, analyzing the hierarchical netlist for data flow includes grouping nets as a function of source, destination and physical location on the integrated circuit.

In one embodiment, analyzing the hierarchical netlist for data flow includes deleting power and ground supplies, replacing one or more inputs with an input data vector and replacing one or more outputs with an output data vector.

Figure 7A:
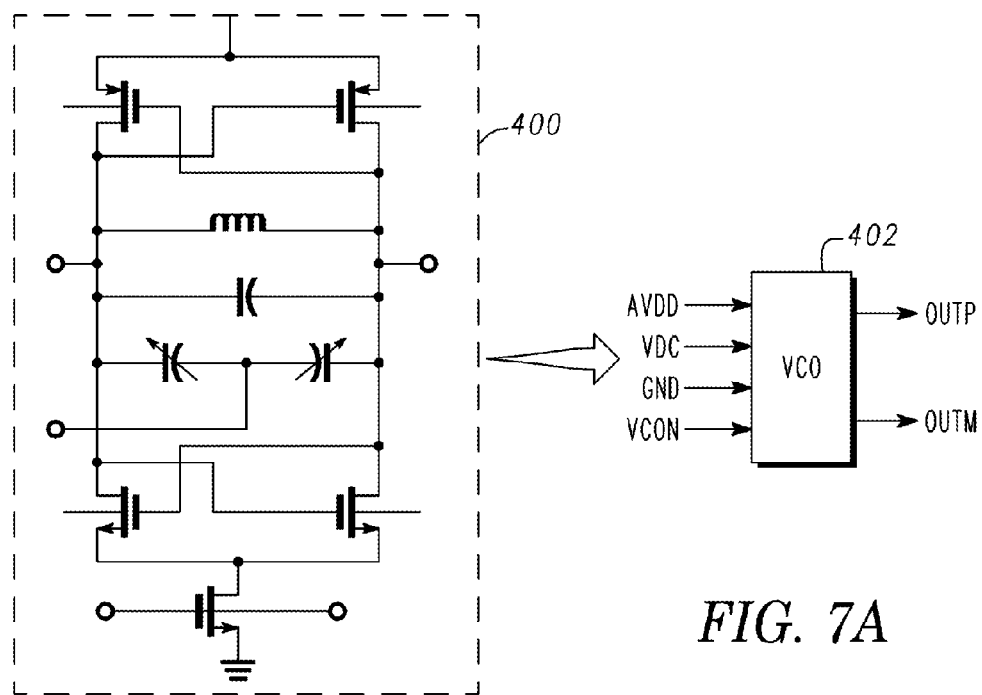
FIGS. 7A and 7B show examples of data flow analysis in accordance with some embodiments.
Figure 7B:
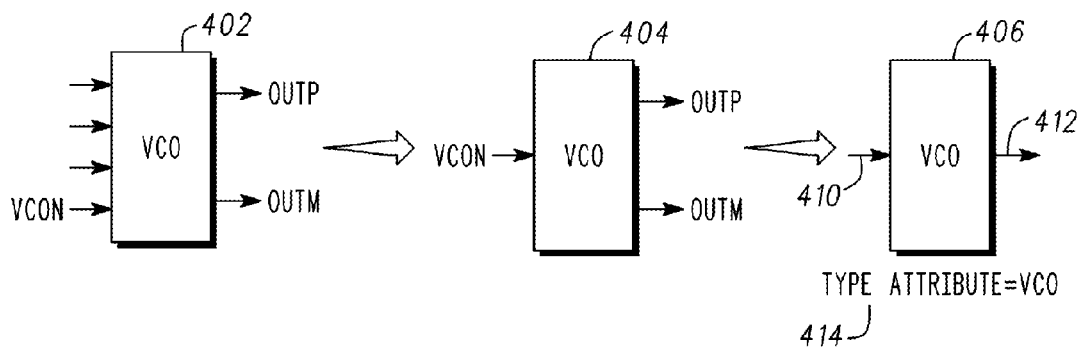

An example of data flow analysis is shown in FIGS. 7A and 7B. In the example embodiment of FIG. 7A, a netlist 400 is replaced by a black box 402 with the same inputs and outputs, and a functional attribute (here the attribute is VCO). At FIG. 7B, data flow analysis first deletes any power and ground supplies in black box 404 (since they are not part of the data path flow) and replaces the input and output with an equivalent data flow vector in black box 406. The final black box 406 has an input data flow 410, an output data flow 412 and a "type" attribute 414 of "VCO".

Figure 8:
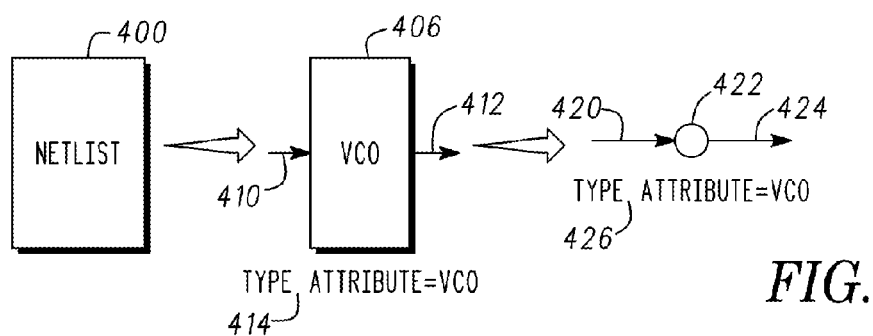
FIG. 8 illustrates the identification and conversion of a VCO netlist in accordance with some embodiments.

In one embodiment, the methods implement an automated hierarchy and functionality extraction process. In one such embodiment, as is illustrated in FIG. 8, a VCO netlist 400 is identified and converted to a black box 406 with input data flow 410, output data flow 412 and a "Type" attribute 414 of "VCO". Data path analysis is then performed on black box 406 to arrive at a connected graph with input data flow 420, node 422 and output data flow 424. In the embodiment shown in FIG. 8, node 422 retains the "Type" attribute 426 of "VCO".

Figure 9:
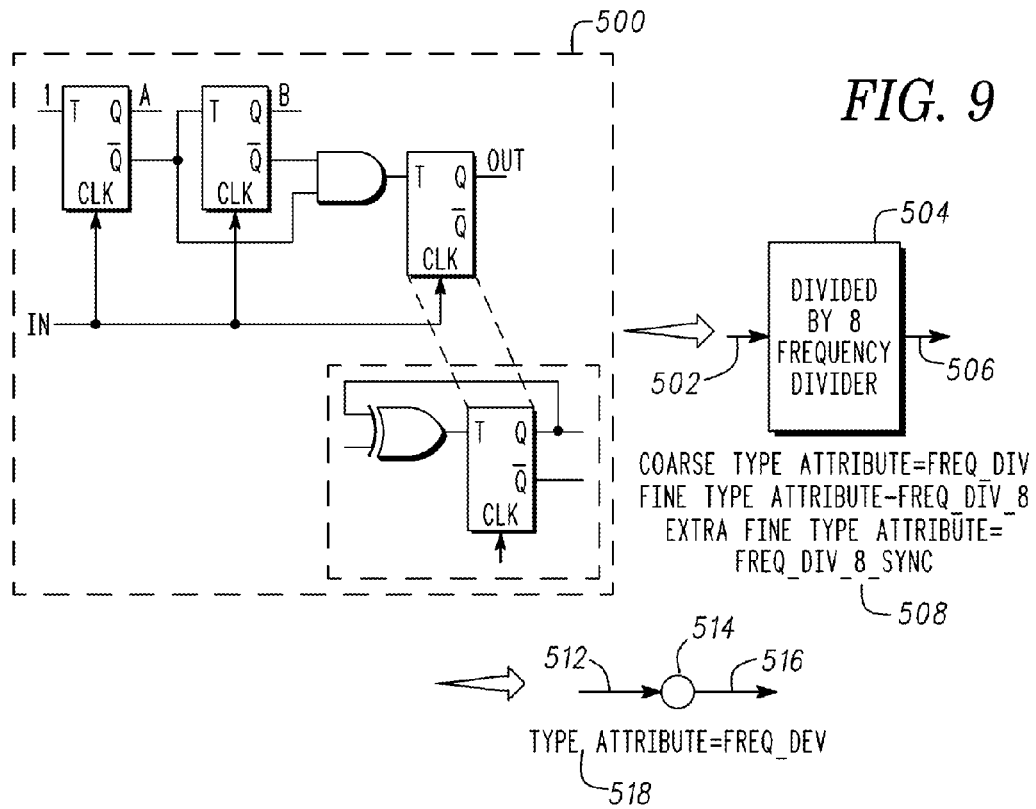
FIG. 9 illustrates the identification and conversion of a frequency divider netlist in accordance with some embodiments.

In one example embodiment, as is illustrated in FIG. 9, a frequency divider netlist 500 is identified and converted to a black box 504 with input data flow 502, output data flow 506 and a "Type" attribute 508 of "VCO". Data path analysis is then performed on black box 504 to arrive at a connected graph with input data flow 512, node 514 and output data flow 516. In the embodiment shown in FIG. 9, node 514 retains the "Type" attribute 518 of "FREQ_DIV".

Figure 10:
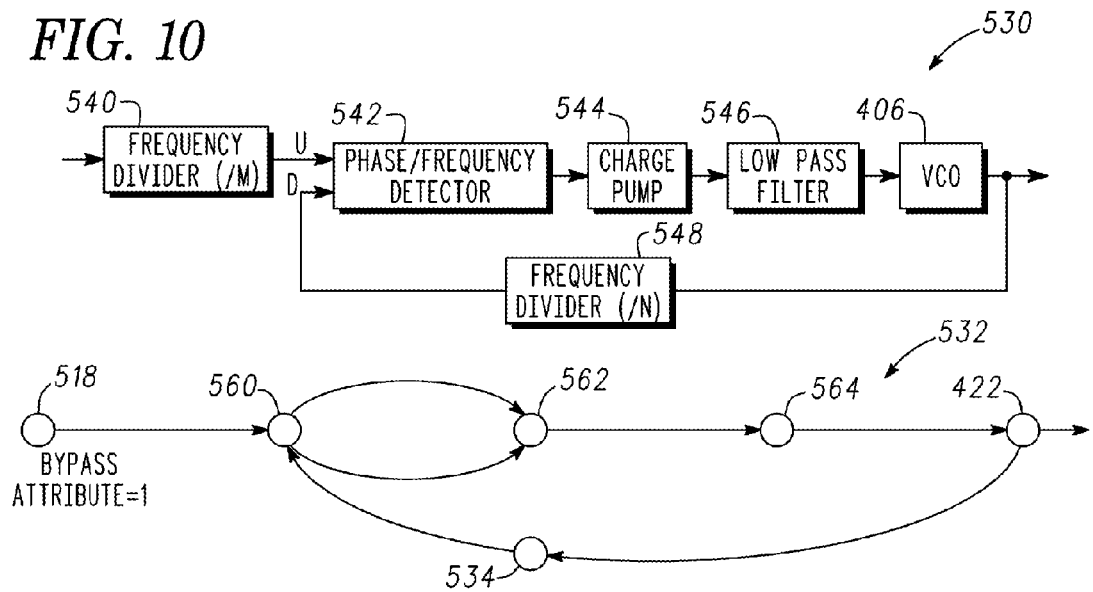
FIG. 10 illustrates the identification and conversion of a phase-locked loop function in accordance with some embodiments.

In one example embodiment, as is illustrated in FIG. 10, a phase locked loop (PLL) function 530 is identified and converted to a graphical representation 532 of a phase locked loop. In one such embodiment, the converted netlist is then stored in library 108 and used to identify PLLs in subsequent integrated circuits. In the PLL of FIG. 10, each block and each node include a "Functional Type" attribute and a "Bypass" attribute.

As can be seen in FIG. 10, frequency divider 540 is converted to a node 518 with a "Functional Type" attribute=Freq_Div_M and a "Bypass" attribute=1. As noted above, in some embodiments a "Bypass" attribute=1 indicates that frequency divider 540 does not have to be in the flow and can be bypassed.

Phase/frequency detector 542 in FIG. 10 is converted to a node 560 with a "Functional Type" attribute=Phase_Freq_Det and a "Bypass" attribute=0. Charge pump 544 is converted to a node 562 with a "Functional Type" attribute=Charge_pump and a "Bypass" attribute=0. Low pass filter 546 is converted to a node 564 with a "Functional Type" attribute=Low_Pass_Fil and a "Bypass" attribute=0. VCO 406 is converted to a node 422 with a "Functional Type" attribute=VCO and a "Bypass" attribute=0. And frequency divider 548 is converted to a node 534 with a "Functional Type" attribute=Freq_Div_N and a "Bypass" attribute=0.

Figure 11:
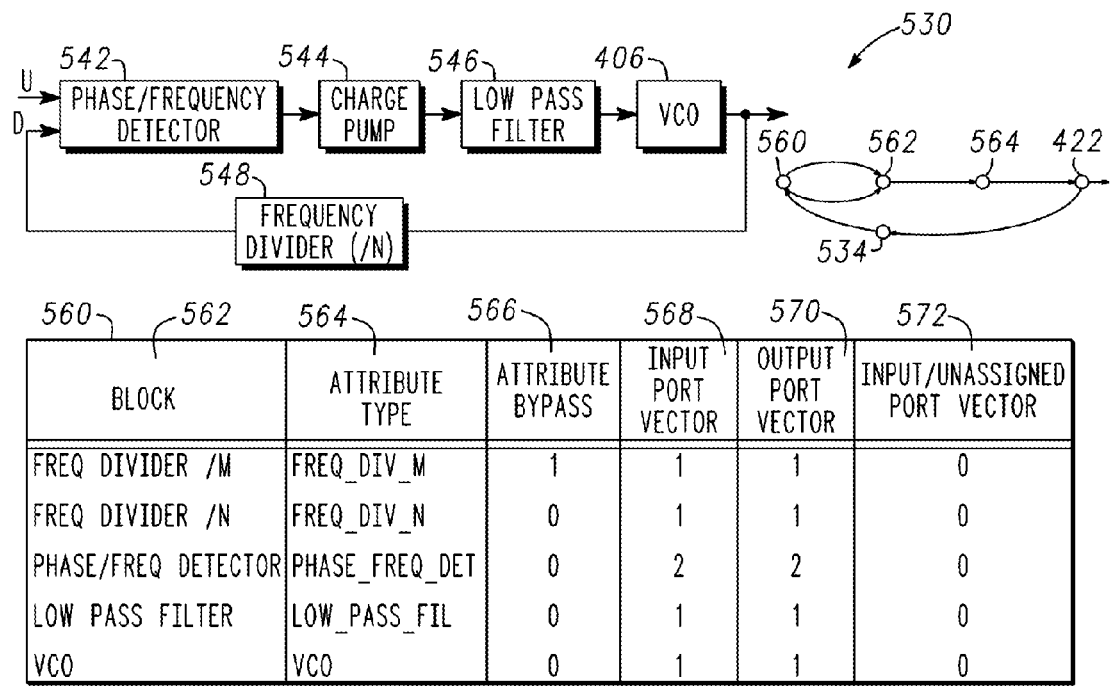
FIG. 11 illustrates the storing of nodes and attributes in accordance with some embodiments.

In some embodiments, nodes and their attributes are stored in a table 560, such is shown in FIG. 11. In the example embodiment of FIG. 11, each block includes a block name 562, an attribute "Type" 564, an attribute "Bypass" 566, an input port vector 568, an output port vector 570 and, in some embodiments, an inout/unassigned port vector 572.

In the example shown in FIG. 11, frequency divider 540 is removed because its "bypass" attribute is =1.

Figure 12:
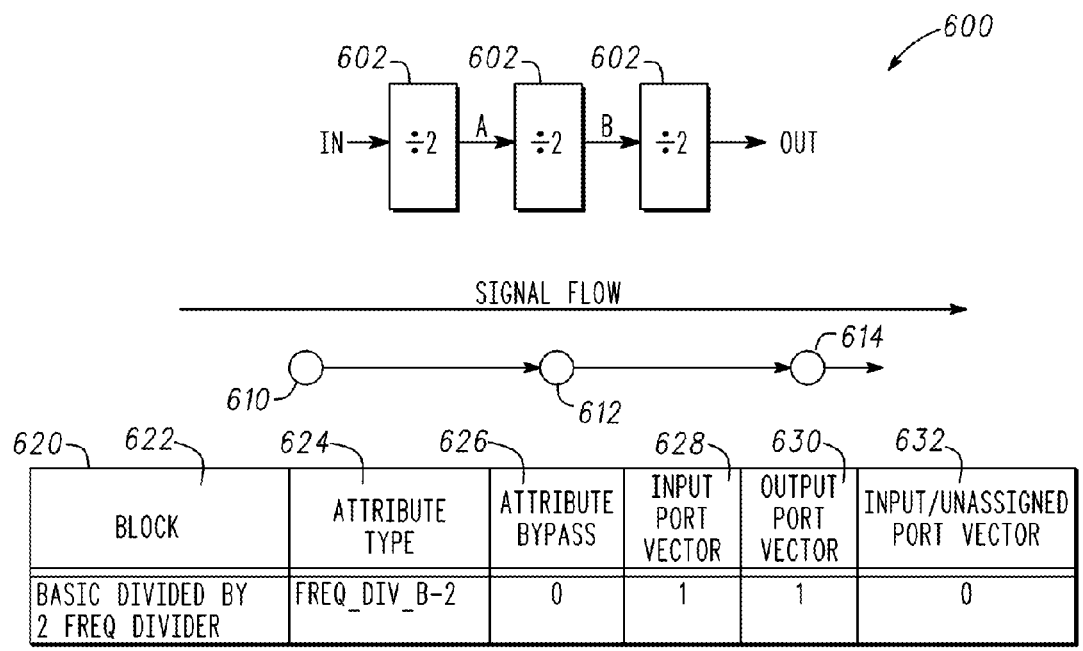
FIG. 12 illustrates a frequency divider and the storing of nodes and associated attributes in accordance with some embodiments.

A frequency divider 600 is shown in FIG. 12. In the example embodiment of FIG. 12, frequency divider 600 includes three divide-by-two frequency dividers 602 arranged serially. The first divider 602 is converted to a node 610 with a "Functional Type" attribute=Freq_Div_B_2 and a "Bypass" attribute=0. The second divider 602 is converted to a node 612 with a "Functional Type" attribute=Freq_Div_B_2 and a "Bypass" attribute=0. The third divider 602 is converted to a node 614 with a "Functional Type" attribute=Freq_Div_B_2 and a "Bypass" attribute=0. Note that, in this example, a signal flow path is identified while control and auxiliary signals are collapsed and ignored.

In some embodiments, nodes and their attributes are stored in a table 620, such is shown in FIG. 12. In the example embodiment of FIG. 12, each block includes a block name 622, an attribute "Type" 624, an attribute "Bypass" 626, an input port vector 628, an output port vector 630 and, in some embodiments, an inout/unassigned port vector 632. In one such embodiment, the converted netlist is then stored in library 108 and used to identify divide-by-eight frequency dividers in subsequent integrated circuits.

Figure 13:
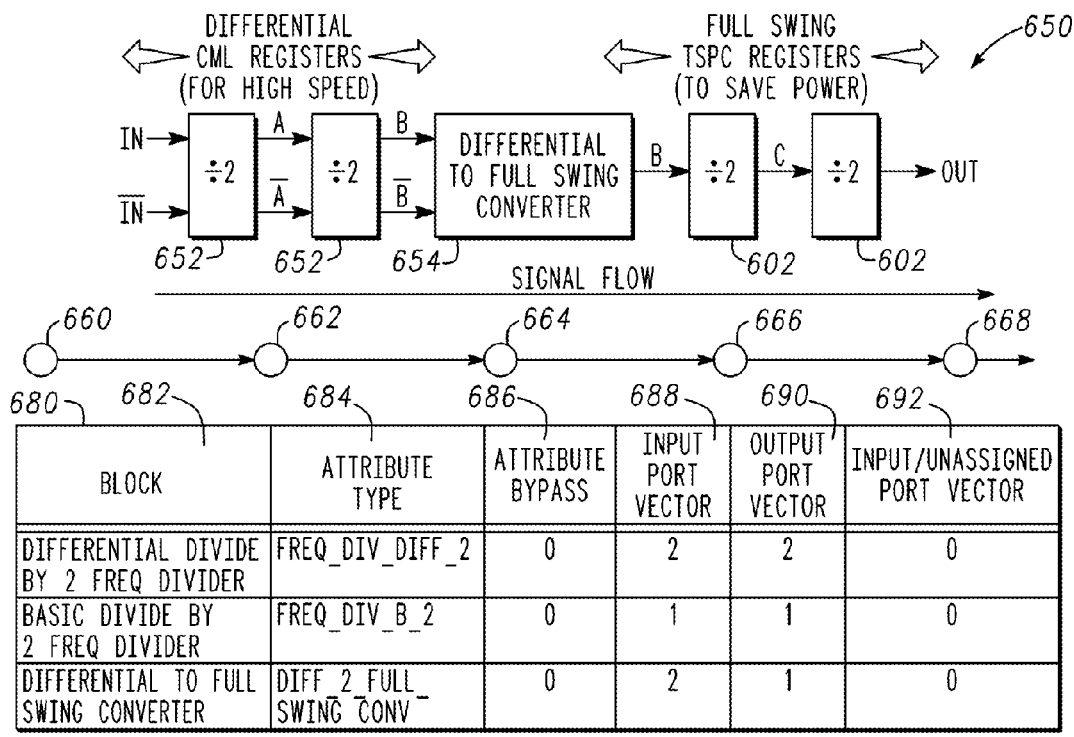
FIG. 13 illustrates a high-speed, low power, asynchronous frequency divider that includes two differential CML registers and the storing of nodes and associated attributes in accordance with some embodiments.

Another frequency divider is shown in FIG. 13. In the example embodiment of FIG. 13, frequency divider 650 is a high-speed, low power, asynchronous frequency divider which includes two differential CML registers configured as divide by two frequency dividers 652, a differential to full swing converter 654 and two full swing TSPC registers configured as by two divide by two frequency dividers 602. The differential CML registers are used for their inherent speed, while the two dividers 602 are used to save power.

The first divider 652 is converted to a node 680 with a "Functional Type" attribute=Freq_Div_Diff_2 and a "Bypass" attribute=0. The second divider 652 is converted to a node 612 with a "Functional Type" attribute=Freq_Div_Diff_2 and a "Bypass" attribute=0. Converter 654 is converted to a node 664 with a "Functional Type" attribute=Diff_2_Full_Swing_Conv and a "Bypass" attribute=0. The first divider 602 is converted to a node 666 with a "Functional Type" attribute=Freq_Div_B_2 and a "Bypass" attribute=0. The second divider 602 is converted to a node 668 with a "Functional Type" attribute=Freq_Div_B_2 and a "Bypass" attribute=0.

In some embodiments, nodes and their attributes are stored in a table 680, as shown in FIG. 13. In the example embodiment of FIG. 13, each block includes a block name 682, an attribute "Type" 684, an attribute "Bypass" 686, an input port vector 688, an output port vector 690 and, in some embodiments, an inout/unassigned port vector 692. In one such embodiment, the converted netlist is then stored in library 108 and used to identify divide-by-sixteen frequency dividers in subsequent integrated circuits.

Figure 14:
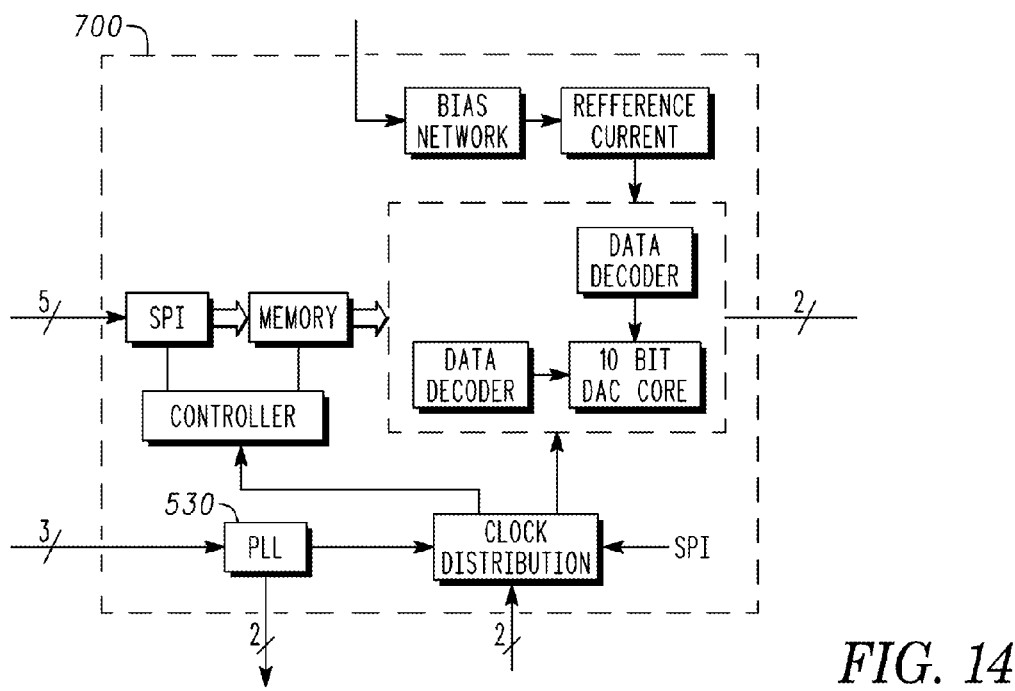
FIG. 14 illustrates the use of a library function in an integrated circuit in accordance with some embodiments.

An example of the use of a library function in an integrated circuit 700 is shown in FIG. 14. In the example circuit 700 of FIG. 14, PLL 530 is identified and used to replace the underlying phase lock loop structure.

The advantage of the behavioral pattern matching described above in netlist modeling of mixed signal circuits is that the process results in a graphical representation of the hierarchical netlist, conversion of all cells and blocks into black-boxes, identification of all major arteries and data paths, collapse of all block I/O terminals into data flow vectors, collapse or elimination of all auxiliary and control signals, elimination of power and grounds unless they are part of data flow, collapse or elimination of clock distribution network, conversion of the netlist into a minimal functional data path flow diagram, creation of a block diagram level library of mixed signal functions and behavioral pattern/model matching between the post processed graphical netlist and the graphical library.

The above described approaches help mitigate unprecedented supply chain risk due to increasing offshore design and fabrication of mixed-signal ICs. Reverse engineering an IC via imaging produces a low level netlist that is not human-readable and the above approaches help reverse engineer the netlist into a human-readable form. The above described approaches permit comparison of the resident circuit on a mixed signal IC to its commercially available datasheet and help with the detection of malicious or suspect circuitry in an IC.

Embodiments may be implemented in one or a combination of hardware, firmware and software. Embodiments may also be implemented as instructions stored on a computer-readable storage device 112, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the synchronous data system 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computer-implemented method for conversion of a low-level netlist to a higher-level netlist, comprising:
   receiving, by a processor, a low-level netlist that represents electronic circuitry of an integrated circuit;
   converting, by a processor, the low-level netlist into a connected graph;
   mapping, by a processor, physical location parameters of the electronic circuitry of the integrated circuit onto the connected graph;
   identifying, by a processor, one or more landmark structures of the electronic circuitry of the integrated circuit in the connected graph, wherein identifying includes recording a physical location on the integrated circuit associated with each of the one or more landmark structures;
   searching, by a processor, for patterns in the connected graph, wherein searching proceeds outward from an anchor defined by the physical location of each of the one or more identified landmark structures; and
   when a pattern is identified, replacing the identified pattern in the low-level netlist with a higher-level abstraction representing the identified pattern in a higher-level netlist that represents the electronic circuitry of the integrated circuit.

2. The method of claim 1, wherein identifying landmark structures includes matching structures to netlist circuits by searching for landmarks in a predefined order.

3. The method of claim 2, wherein the predefined order defines a search that searches for less common patterns before searching for more common patterns.

4. The method of claim 3, wherein mapping location parameters includes attaching a spatial coordinate attribute to each node.

5. The method of claim 2, wherein searching for patterns includes identifying patterns that exist in a library and modifying the connected graph to replace a matched pattern with its more abstract match.

6. The method of claim 2, wherein identifying landmark structures includes identifying, as an initial landmark, a landmark that includes less abundant structures.

7. The method of claim 2, wherein identifying landmark structures includes identifying, as initial landmarks, landmarks that have been shown to drive the search to converge more quickly.

8. The method of claim 7, wherein identifying landmark structures includes identifying a priority by which the connected graph is searched for landmarks.

9. The method of claim 8, wherein, if a first structure and a second structure are treated as equal priority, searching for patterns in the connected graph includes selecting the structure that is closest to a particular landmark structure.

10. The method of claim 9, wherein selecting the structure that is closest to a particular landmark structure includes modifying the connected graph to replace the selected structure with a more abstract match.

11. The method of claim 10, wherein searching for patterns in the connected graph includes searching for patterns that include the more abstract matches and replacing the patterns that include the more abstract matches with a higher level structure.

12. The method of claim 1, wherein searching outward from the anchors includes identifying all elements connected to the anchor and searching for patterns in those elements before proceeding outward further from the anchor.

13. The method of claim 1, wherein searching outward from the anchors includes identifying all elements that fall within a pre-defined distance from each anchor and searching for patterns in those elements before proceeding outward further from the anchor.

14. The method of claim 13, wherein the pre-defined distance is programmable.

15. At least one non-transitory machine-readable medium including instructions, which when executed by a machine, cause the machine to perform the method of claim 1.

16. A system for converting a low-level netlist to a higher-level netlist, comprising:
a computing processor;
an abstraction module; and
a library;
wherein the abstraction module receives a low-level netlist that represents electronic circuitry of an integrated circuit, converts the low-level netlist into a connected graph, assigns a physical location parameter of the electronic circuitry of the integrated circuit to nodes within the connected graph, searches the connected graph for patterns that exist in the library, and when a pattern is identified, the identified pattern in the low-level netlist is replaced with a higher-level abstraction representing the identified pattern in a higher-level netlist that represents the electronic circuitry of the integrated circuit, wherein the search proceeds in a predefined order through the patterns in the library.

17. The system of claim 16, wherein the predefined order defines a search that searches for less common patterns before searching for more common patterns.

18. The system of claim 16, wherein the abstraction module implements one or more pattern matching search algorithms, including searching for one or more landmark structures as search anchors and searching outward from the anchors.

19. The system of claim 18, wherein the abstraction module searches outward from the anchors, wherein searching outward from the anchors includes finding all elements connected to the anchor and determining if the elements connected to the anchor match one or more patterns in the library.

20. The system of claim 18, wherein the abstraction module searches outward from the anchors, wherein searching outward from the anchors includes finding all elements within a pre-defined distance of the anchor and determining if the elements found within the pre-defined distance of that anchor match one or more patterns in the library.

21. A computer-implemented method, comprising:
receiving a low-level netlist representing an integrated circuit;
adding hierarchy to the low-level netlist to form a hierarchical netlist;
analyzing the hierarchical netlist for data flow; and
converting the hierarchical netlist into a functional and data flow-based netlist of blocks,
wherein each block includes attributes and constraints,
wherein converting the hierarchical netlist into a functional and data flow-based netlist includes assigning a function type attribute to each block in the functional and data flow-based netlist,
wherein the function type attribute identifies blocks that differ in implementation but share a certain function, and
wherein adding hierarchy to the low-level netlist to form a hierarchical netlist includes:
receiving, by a processor, the low-level netlist;
converting, by a processor, the low-level netlist into a connected graph;
mapping, by a processor, physical location parameters of electronic circuitry of the integrated circuit onto the connected graph;
identifying, by a processor, landmark structures of the electronic circuitry of the integrated circuit in the connected graph, wherein identifying includes recording a physical location on the integrated circuit associated with each landmark structure;
searching, by a processor, for patterns in the connected graph, wherein searching proceeds outward from an anchor defined by the physical location of each of the identified landmark structures, wherein searching for patterns includes identifying patterns that exist in a library; and
modifying, by a processor, the connected graph to replace a matched pattern with a block representing the pattern.

22. A system for converting a low-level netlist to a higher-level netlist, comprising:
an abstraction module; and
a library;
wherein the abstraction module receives a low-level netlist representing an integrated circuit, adds hierarchy to the low-level netlist to form a hierarchical netlist, analyzes the hierarchical netlist for data flow, and converts the hierarchical netlist into a functional and data flow-based netlist of blocks,
wherein the library includes a plurality of functional blocks, wherein each block includes an input vector definition, an output vector definition, and attributes and constraints assigned to the block, wherein analyzing the hierarchical netlist for data flow includes deleting power and ground supplies, replacing one or more inputs with an input data vector, and replacing one or more outputs with an output data vector, wherein adding hierarchy to the low-level netlist to form a hierarchical netlist includes:
  converting the low-level netlist into a connected graph;
  mapping physical location parameters of electronic circuitry of the integrated circuit onto the connected graph;
  identifying landmark structures of the electronic circuitry of the integrated circuit in the connected graph, wherein identifying includes recording a physical location on the integrated circuit associated with each landmark structure;
  searching for patterns in the connected graph, wherein searching proceeds outward from an anchor defined by the physical location of each of the identified landmark structures, wherein searching for patterns includes identifying patterns that exist in a library; and
  modifying the connected graph to replace a matched pattern with a block representing the pattern.

* * * * *

UNITED STATES PATENT AND TRADEMARK OFFICE
CERTIFICATE OF CORRECTION

PATENT NO. : 9,830,414 B2  
APPLICATION NO. : 14/658337  
DATED : November 28, 2017  
INVENTOR(S) : Parviz Saghizadeh Page 1 of 1

It is certified that error appears in the above-identified patent and that said Letters Patent is hereby corrected as shown below:

In the Specification

In Column 4, Line 25, after "circuits", insert --.--

In Column 8, Line 4, delete "103" and insert --102-- therefor

Signed and Sealed this  
Fifth Day of May, 2020

Andrei Iancu  
*Director of the United States Patent and Trademark Office*